United States Patent [19]

Tanaka et al.

[11] 4,037,247
[45] July 19, 1977

[54] STILL COLOR TELEVISION SIGNAL RECORDING AND REPRODUCING APPARATUS

[75] Inventors: Yoshinori Tanaka, Yokohama; Hisaaki Narahara, Musashino, both of Japan

[73] Assignee: Sony Corporation, Tokyo, Japan

[21] Appl. No.: 696,408

[22] Filed: June 15, 1976

[30] Foreign Application Priority Data

June 23, 1975 Japan .................................. 50-77354

[51] Int. Cl.² ............................................. H04N 9/02
[52] U.S. Cl. ......................................... 358/4; 358/11
[58] Field of Search ............... 358/1, 4, 21, 127, 180, 358/11, 140; 340/173 CR; 315/37 D

[56] References Cited

U.S. PATENT DOCUMENTS

| | | | |
|---|---|---|---|
| 3,379,833 | 4/1968 | Hecker et al. | 358/180 |
| 3,673,323 | 6/1972 | Gustafson | 358/140 |
| 3,812,522 | 5/1974 | Izura et al. | 358/4 |
| 3,943,280 | 3/1976 | Kimura et al. | 358/180 |

Primary Examiner—John C. Martin
Assistant Examiner—Aristotelis M. Psitos
Attorney, Agent, or Firm—Lewis H. Eslinger; Alvin Sinderbrand

[57] ABSTRACT

There is disclosed a still color television signal recording and reproducing apparatus which utilizes a single storage tube of a conventional type. Circuitry is shown which enables to store one field or frame of a color television signal together with a color burst signal in a storage tube and to read out the stored signal from the storage tube with minimum frequency deviation for the color burst and chrominance signals. Then, the read out signal is supplied to a color television monitor including a reference oscillator which is phase-locked to the color burst signal in order to demodulate a plurality of color component signals whereby a still color picture of good quality is reproduced on a cathode ray tube in the color television monitor.

6 Claims, 9 Drawing Figures

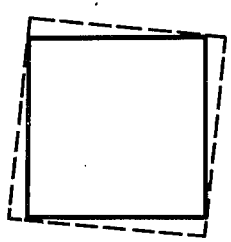
Fig. 1A
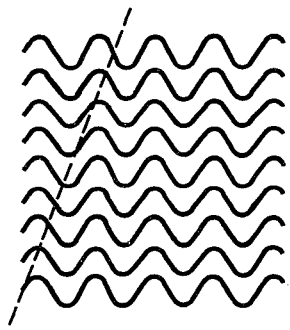
Fig. 1B
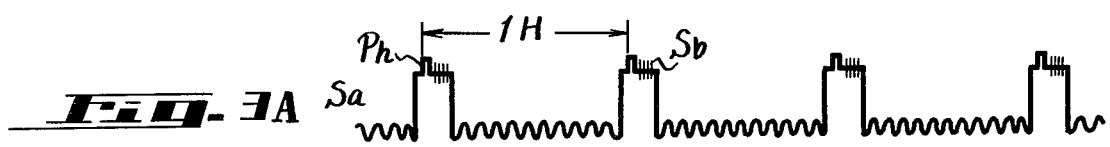
Fig. 3A
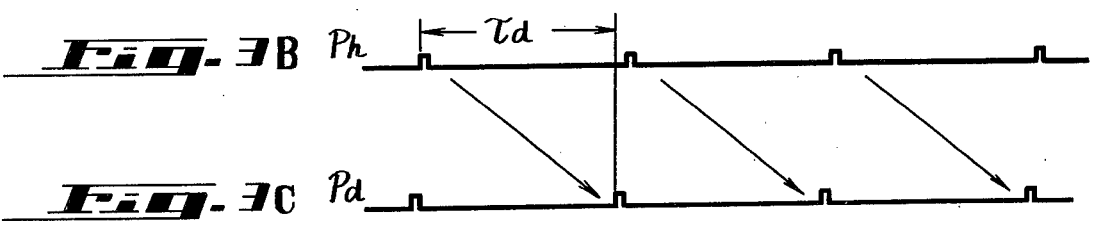
Fig. 3B
Fig. 3C
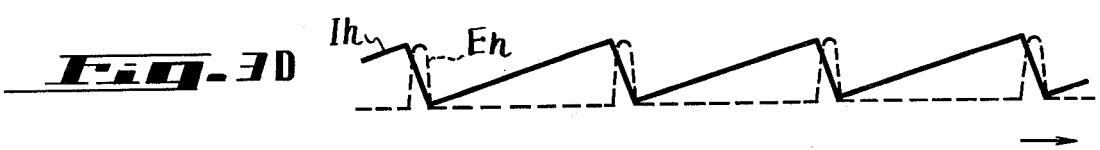
Fig. 3D
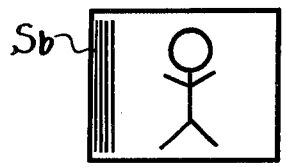
Fig. 3E
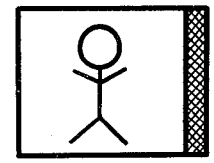
Fig. 3F

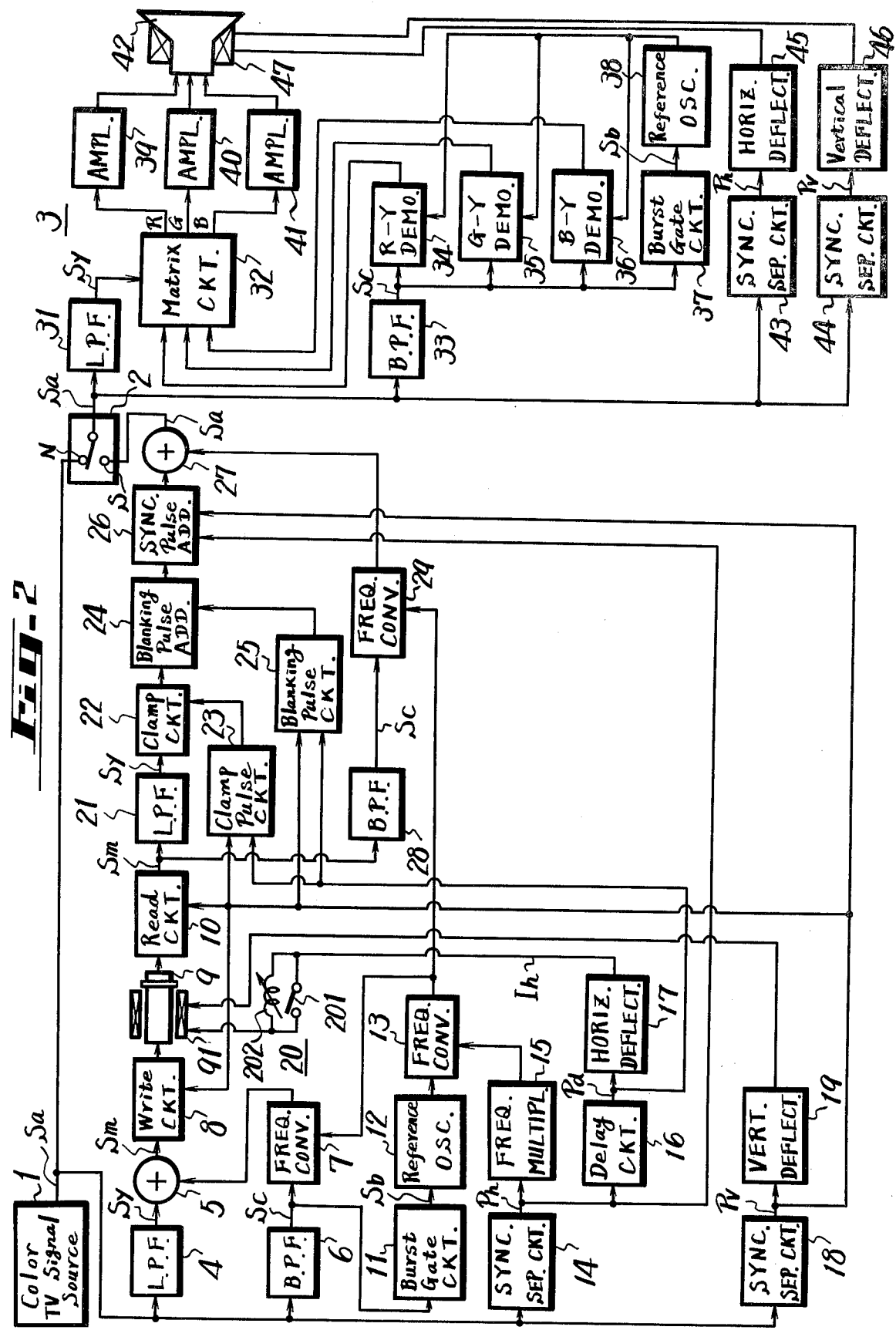

STILL COLOR TELEVISION SIGNAL RECORDING AND REPRODUCING APPARATUS

BACKGROUND OF THE INVENTION

1. Field of the Invention

This invention relates generally to a still color television signal recording and reproducing apparatus, and more particularly to such an apparatus which utilizes a single storage tube of a conventional type.

2. Description of the Prior Art

It is well known in the prior art that a certain selected field or frame of a monochrome television signal is stored on a target of a storage tube utilizing electron beams modulated by the television signal and the stored signal is read out afterwards for a still television signal reproduction by scanning the target of the storage tube repeatedly with non-modulated electron beams.

Such an operation of a conventional storage tube is described, for example, in papers published in the IEEE Transactions on Electron Devices, vol. ED-18, No. 4, April, 1971, "Electronic Image Storage Utilizing a Silicon Dioxide Target," by R. S. Silver and E. Luedicke, pp 229–235.

The biasing voltage for the target electrode of the storage tube upon a WRITE mode is made different from that upon a READ mode such as described in the papers mentioned above and, for example, the target voltage of +200 volts upon the WRITE mode is decreased to +8 volts upon the READ mode. Therefore, the velocity of the electron beams between the G4 and the target electrodes becomes slower for the READ mode than that for the WRITE mode, so that the raster size on the target for the READ mode becomes larger than that for the WRITE mode. And further the raster shape on the target for the READ mode becomes twisted as compared with that for the WRITE mode as shown in FIG. 1A, because the scanning electron beams are differently rotated by a focusing magnetic field of the storage tube.

Now thinking of storing and reading a color television signal in and from such a single storage tube, a first serious trouble arises that the frequencys of a color signal component and a color burst component included in the color television signal read out from the storage tube become different from the original frequencys previously stored in the storage tube. And further a second serious trouble arises that the phases of the color signal component and the color burst component read out from the storage tube become shifted every horizontal period, because the raster shape for the READ mode is twisted and the electron beams are directed along the dotted lines shown in FIG. 1B at the beginning of every horizontal scanning period where waveforms shown in FIG. 1B represents electron charge pattern of every horizontal period on the target of the storage tube.

Such a phase shift accumulatively causes a frequency deviation after a number of horizontal scanning periods. In the prior art no simple or practical way was found to solve the first and the second serious troubles mentioned above.

OBJECTS AND SUMMARY OF THE INVENTION

Accordingly, it is an object of the invention to provide an improved still color television signal recording and reproducing apparatus utilizing a single storage tube, and in which the inherent disadvantages of the prior art are avoided.

Another object of the invention is to provide an improved still color television signal recording and reproducing apparatus in which a single storage tube is employed and a specific deflection method for the storage tube is employed.

A further object of the invention is to provide a specific still color television signal recording and reproducing apparatus in which a single storage tube is employed, a certain selected field or frame of a color television signal is stored in and read out from the storage tube together with its color burst component, and the color burst component read out therefrom is utilized for locking a reference oscillator included in a chrominance channel of a color picture reproducing stage.

According to the invention one field or frame of a color video signal is stored in a single storage tube during a WRITE period together with a color burst signal and the stored signal is read out therefrom during a READ period.

The storage tube has a deflection coil assembly and a specific deflection method is employed such that the horizontal scanning size on the target of the storage tube upon the READ period is made substantially equal to that upon the WRITE period. In this way the stored color video signal is read out from the storage tube with minimum frequency deviation for the color burst signal and also for the chrominance signal contained in the color video signal.

The read out color video signal is supplied to a color television monitor which includes a reference oscillator for demodulating a plurality of color component signals. The reference oscillator is of an injection locked type which is synchronized with the color burst signal from the storage tube, so that a still color picture of a good quality is reproduced on a cathode ray tube included in the color television monitor.

This invention may be better understood, however, when the following detailed description is read in connection with the accompanying drawings.

BRIEF DESCRIPTION OF THE DRAWINGS

FIGS. 1A and 1B are conceptional diagrams respectively to be used for explaining an operation of a storage tube;

FIG. 2 is a block diagram of a still color television signal recording and reproducing apparatus according to one embodiment of the invention; and FIGS. 3A–3F, inclusive, are waveform diagrams respectively to be used for explaining the operation of the still color television signal recording and reproducing apparatus of the invention show in FIG. 2.

DESCRIPTION OF THE PREFERRED EMBODIMENT

An example of the present invention will be hereinafter described with reference to the drawings.

In FIG. 2 which shows an example of the invention, 1 designates a color television signal source. The color television signal source 1 is, for example, an input stage of a color television receiver which includes an antenna, a tuner, an IF amplifier, a video detector, etc.

From the signal source 1, there is derived a composite color video signal $Sa$ which is shown in FIG. 3A. The signal $Sa$ is an ordinary color television signal which contains a burst signal $Sb$ and a horizontal synchronizing signal $Ph$ shown in FIG. 3A.

The color video signal Sa from the signal source 1 is supplied through a switching circuit 2 (a contact N thereof) to a monitor receiver 3.

In the monitor receiver 3, the color video signal Sa from the switching circuit 2 is supplied to a low pass filter 31 from which a luminance signal Sy is derived. The luminance signal Sy is supplied to a matrix circuit 32. The color video signal Sa from the switching circuit 2 is supplied also to a band pass filter 33 which produces a chrominance signal Sc and supplies the same to color demodulator circuits 34 to 36, respectively. The chrominance signal Sc from the band pass filter 33 is applied further to a burst gate circuit 37 from which a color burst signal Sb is derived. The color burst signal Sb is then supplied to a reference oscillator 38. The reference oscillator 38 is of an injection locked type which is speedly synchronized to an input signal of a wide frequency range. From the reference oscillator 38 there is derived a continuous signal synchronized with the color burst signal Sb which is then supplied to the color demodulator circuits 34 to 36, respectively. Thus, the color demodulator circuits 34 to 36 demodulate three color difference signals of R—Y, G—Y and B—Y, respectively which are supplied to the matrix circuit 32. Then, this matrix circuit 32 produces three primary color component signals of R(red), G(green) and B(blue), which are the fed through output amplifiers 39 to 41, respectively, to an electron gun (not shown) of a color cathode ray tube 42.

The color video signal Sa from the switching circuit 2 is further supplied to sync. separator circuits 43 and 44 which horizontal and vertical synchronizing pulses Ph and Pv are derived, respectively. These pulses Ph and Pv are supplied to horizontal and vertical deflection circuits 45 and 46, respectively, which then produce horizontal and vertical deflection currents. These deflection currents are fed to a deflection coil assembly 47 of the color cathode ray tube 42. Thus, a color picture is displayed on the color cathode ray tube 42.

The still color television signal recording and reproducing apparatus of the present invention shown in FIG. 2 will be now described in detail.

The color video signal Sa from the signal source 1 is supplied further to a low pass filter 4 which passes therethrough a luminance signal Sy. The luminance signal Sy is supplied to an adder circuit 5. The color video signal Sa from the signal source 1 is fed also to a band pass filter 6 which passes therethrough a chrominance signal Sc and supplies the signal Sc to a frequency converter 7. The chrominance signal Sc from the band pass filter 6 is supplied also to a burst gate circuit 11 from which a burst signal Sb is derived. The burst signal Sb is fed to a reference oscillator circuit 12 of an injection locked type. Then, the reference oscillator circuit 12 produces a continuous wave signal is synchronism with the burst signal Sb. The continuous wave signal is then fed to a frequency converter circuit 13. The color video signal Sa from the signal source 1 is supplied further to a sync. separator circuit 14 which then produces a horizontal synchronizing pulse Ph shown in FIG. 3B. The pulse Ph is supplied to a frequency multiplier circuit 15 which then produces an oscillation signal whose frequency $f_c$ is $n \cdot f_h (f_c = n \cdot f_h)$ where $n$ is a positive integer and $f_h$ a horizontal frequency (for example, $f_c = 3.5$ MHz). The oscillation signal from the circuit 15 is supplied to the frequency converter 13 whose output signal is then supplied to the frequency converter 7. Thus, the carrier frequency of the chrominance signal $S_C$ from the band pass filter 6 is converted to a frequency $f_c$.

The reason why the carrier frequency of the chrominance signal $S_C$ is converted to $n \cdot f_h$ is well known in the art but will be described briefly. The carrier frequency of the chrominance signal $S_C$ from the band pass filter 6 is $(n+\frac{1}{2})f_h$ in, for example, NTSC system and hence is odd multiples of one-half line-scanning frequency. If such a chrominance signal is stored directly in a storage tube, the chrominance signal level upon reading out is substantially zero. Accordingly, it is necessary that the carrier frequency of the chrominance signal is frequency-converted to be one which is even multiples of one-half line-scanning frequency.

The chrominance signal $S_C$, which is frequency-converted by the frequency converter 7, is supplied to the adder circuit 5 in which the chrominance signal $S_C$ is added to the luminance signal Sy and which then produces a modified color composite video signal Sm. This modified color video signal Sm is supplied to a WRITE circuit 8 of a storage tube 9.

The horizontal synchronizing pulse Ph from the sync. separator circuit 14 is also fed to a delay circuit 16 which produces a delayed pulse Pd by a period $\tau_d$ a little shorter than one horizontal period as shown in FIG. 3C. The delayed pulse Pd is supplied to a horizontal deflection circuit 17 which produces a horizontal deflection current Ih in synchronism with the delayed pulse Pd as shown in FIG. 3D in which Eh shown by dotted lines represents a horizontal deflection voltage. This horizontal deflection current Ih is fed to a deflection coil assembly 91 of the storage tube 9 through a compensation circuit 20 which is constituted by a parallel circuit of a switch 201 and a compensation coil 202. The switch 201 is closed during the WRITE mode and is open during the READ mode of the storage tube 9.

The color video signal Sa from the signal source 1 is further supplied to a sync. separator circuit 18 from which the vertical synchronizing signal or pulse Pv is derived. This vertical synchronizing signal Pv is fed to a vertical deflection circuit 19 which produces a vertical deflection current. The vertical deflection current therefrom is fed to the deflection coil assembly 91. The vertical synchronizing pulse Pv is also fed to the WRITE circuit 8 and to a READ circuit 10 which is connected to the storage tube 9.

When the storage tube 9 is in the WRITE mode, the WRITE circuit 8 is made operative by a WRITE switch (not shown). Thus, the electrodes (not shown) of the storage tube 9 are respectively supplied with voltages of the WRITE mode in synchronism with the vertical synchronizing pulse Pv from the synch. separator circuit 18, hence a certain selected field or frame of the modified color video signal Sm is extracted, and then fed to the storage tube 9.

The biasing circuit for the electrodes of the storage tube 9 upon the WRITE mode is well known in the art, so that its description will be omitted.

The electron beams in the storage tube 9 are deflected by the deflection currents supplied from the deflection circuits 17 and 19 to the deflection coil assembly 91 to scan the target of the storage tube 9 and to store the modified color video signal Sm in the selected field or frame on the target of the storage tube 9. In this case, as shown in FIGS. 3A to 3D, the horizontal deflection current Ih is provided in accordance with the delayed pulse Pd, so that if the delayed time period $\tau_d$ of the delayed pulse Pd is previously selected suitably, the rising edge of the horizontal deflection current I$h$ can be selected at a time a little before the burst signal S$b$. Thus, the horizontal scanning is started a little before the burst signal S$b$ and hence, as shown in FIG. 3E, an electric charge pattern by the modified color video signal S$m$ is formed on the target of the storage tube 9 and also the burst signal S$b$ is stored as an electric charge pattern on the edge portion at the horizontal scanning starting side of the electric charge pattern of the signal S$m$.

At the READ mode of the storage tube 9, the READ circuit 10 is made operative by a READ switch (not shown), and the electrodes (not shown) of the storage tube 9 are supplied with voltages of the READ mode, respectively, in synchronism with the vertical synchronizing pulse P$v$ from the synch. separator circuit 18. The biasing circuit for the electrodes of the storage tube 9 upon the READ mode is well known in the art, so that its description will be omitted.

The switch 201 is made open in ganged relation with the READ switch, and the horizontal deflection current I$h$ from the horizontal deflection circuit 17 is fed through the compensation coil 202 to the deflection coil assembly 91 of the storage tube 9. In this case, the horizontal deflection current I$h$ from the deflection circuit 17 is fed through the coil 202, but upon the WRITE mode this horizontal deflection current I$h$ is fed directly to the coil assembly 91 without passing through the coil 202. Therefore, the horizontal dflection current I$h$ supplied to the coil assembly 91 upon the READ mode is reduced as compared with that supplied to the coil assembly 91 upon the WRITE mode by the value corresponding to the inductance value of the compensation coil 202, and accordingly the horizontal raster size of the electron beam in the storage tube 9 upon the READ mode is compensated for by the extent corresponding to the reduced amount of the deflection current I$h$. Therefore, if the inductance value of the coil 202 is selected suitably, the horizontal raster size on the storage surface of the storage tube 9 during the READ mode can be made same as that upon the WRITE mode.

The vertical deflection current from the vertical deflection circuit 19 is also supplied to the deflection assembly 91 of the storage tube 9 and hence the vertical deflection is performed.

Thus the modified video signal S$m$ of one field or frame stored in the storage tube 9 is read out repeatedly and a still color video signal is obtained from the READ circuit 10. The modified S$m$ read out as a still color video signal is fed from the READ circuit 10 to a low pass filter 21 from which the luminance signal S$y$ is derived. This luminance signal S$y$ is fed to a clamp circuit 22. The delayed pulse P$d$ from the delay circuit 16 and the vertical synchronizing pulse P$v$ from the synch. separator circuit 18 are fed to a clamp pulse forming circuit 23 which then produces a clamp pulse. This clamp pulse is fed to the clamp circuit 22, so that the luminance signal S$y$ supplied to the clamp circuit 22 from the low pass filter 21 is clamped such that the pedestal level of the luminance signal S$y$ becomes constant.

The luminance signal S$y$, whose pedestal level is made constant, is supplied to a blanking pulse adder circuit 24. The delayed pulse P$d$ from the delay circuit 16 and the vertical synchronizing pulse P$v$ from the synch. separator circuit 18 are fed to a blanking pulse forming circuit 25, which then produces a blanking pulse. This blanking pulse is fed to the blanking pulse adder circuit 24 which adds the blanking pulse to the luminance signal S$y$. This luminance signal S$y$ from the blanking pulse adder circuit 24 is fed to a synch. pulse adder circuit 26 which is also supplied with the horizontal synchronizing pulse P$h$ and the vertical synchronizing pulse P$v$ from the separator circuits 14 and 18. Thus, the luminance signal S$y$ is added with the horizontal synchronizing pulse P$h$ and the vertical synchronizing pulse P$v$ and then fed to an adder circuit 27.

The modified color video signal S$m$ from the READ circuit 10 is fed also to a band pass filter 28 from which the chrominance signal S$_C$ is derived. This chrominance signal S$_C$ is fed to a frequency converter 29 which is also supplied with the output signal from the converter 13. Thus, the chrominance signal S$_C$ from the band pass filter 28 is frequency-converted by the converter 29 from the carrier frequency $f_c$ to the original value, that is, the chrominance signal S$_C$ with the original frequency is obtained from the converter 29. The chrominance signal S$c$ with the original frequency is supplied to the adder circuit 27 from which a still color video signal S$a$ is obtained which consists of the chrominance signal S$c$ and the luminance signal S$y$. The still color television signal S$a$ from the adder circuit 27 is fed to a contact S of the switch circuit 2.

During the reproduction of a still color television signal, the monitor receiver 3 is supplied with the signal fed to the contact S of the switch circuit 2 and receives the still color video signal S$a$ from the adder 27 and reproduces a still color picture thereon.

The reproduced still color picture on the monitor receiver 3 is such a picture whose right side portion is broken off as shown in FIG. 3F, which is caused by the fact that the burst signal S$b$ is stored at the beginning portion of each horizontal scanning of the storage tube 9. The lack of such picture proposes substantially no problem in practical use.

As described above, one field or frame of the color video signal S$a$ is recorded on the storage tube 9 and then reproduced as the still color video signal. In this case, with the present invention the compensation circuit 20 is provided to make the horizontal raster size upon the READ mode same as that upon the WRITE mode, so that the stored burst signal S$b$ and chrominance signal S$c$ can be reproduced with minimum deviation in frequency.

Further, as described previously in connection with FIGS. 1A and 1B, due to the fact that the raster shape on the target is twisted upon the READ mode of the storage tube 9, the phases of the color burst signal and chrominance signal read out from the storage tube 9 are deviated, and accumulatively the frequency deviation is caused. However, the defect caused by the phase or frequency deviation can be avoided in the invention by employing an injection locked type oscillator, which is speedly synchronized to an input signal of a wide frequency range, as the reference oscillator 38 included in the monitor 3, because the phase or frequency deviation of the read out color burst signal at every horizontal period is substantially same as that of the read out chrominance signal and hence so far as the reference oscillator 38 is speedly synchronized to the read out color burst signal, the color component signals with good quality is demodulated. That is, with the present invention a color picture reproduced on the color cathode ray tube 42 is free from a color phase shift and hence of good quality.

Having described an illustrative embodiment of the invention, it will be apparent that many modifications and variations could be effected therein by one skilled in the art without departing from the spirit and scope of the novel concepts of the present invention as defined in the appended claims.

We claim as our invention:

1. A still color television signal recording and reproducing apparatus comprising:
   a. a color television signal source;
   b. a storage tube having horizontal and vertical deflection means;
   c. WRITE circuit means connected to said signal source for applying a field of a color television signal to said storage tube when operated;
   d. READ circuit means connected to said storage tube for reading out a color video signal from the latter when operated;
   e. a color picture reproducing means connected to said READ circuit means for receiving said color video signal therefrom;
   f. a horizontal deflection circuit connected to said signal source for supplying a horizontal deflection signal to the horizontal deflection means of said storage tube; and
   g. a vertical deflection circuit connected to said signal source for supplying a vertical deflection signal to the vertical deflection means of said storage tube; wherein a compensation circuit is connected to said horizontal deflection circuit for making the horizontal scanning size of the READ period substantially equal to that of the WRITE period for said storage tube; and said color picture reproducing means includes a reference oscillator which receives a color burst component from the color video signal derived from said READ circuit means and is phase-locked to said color burst component in order to demodulate a plurality of color component signals from said color video signal.

2. A still color television signal recording and reproducing apparatus according to claim 1, wherein said horizontal deflection circuit includes a delay circuit and the delay time thereof is selected such that the horizontal scanning period of said storage tube begins at latest at the color burst signal portion of said color television signal from said WRITE circuit means when operated and said color burst signal portion is recorded in said storage tube at the beginning of every horizontal scanning period.

3. A still color television signal recording and reproducing apparatus according to claim 2 further comprises:
   an adder connected between said READ circuit means and said color picture reproducing means; and
   means connected between said adder and said horizontal and vertical deflection circuits for supplying horizontal and vertical synchronizing signals to said adder so that said synchronizing signals are added to said color video signal from said READ circuit means.

4. A still color television signal recording and reproducing apparatus according to claim 3, wherein said horizontal synchronizing signal supplied to said adder is derived from the input side of the delay circuit included in said horizontal deflection circuit.

5. A still color television signal recording and reproducing apparatus according to claim 4 further comprising a clamp circuit connected between said READ circuit means and said color picture reproducing means for clamping the pedestal level of said read out color video signal.

6. A still color television signal recording and reproducing apparatus comprising:
   a. a color television signal source;
   b. a first low pass filter connected to said signal source for filtering out a luminance component from said color television signal;
   c. a first band pass filter connected to said signal source for filtering out a chrominance component from said color television signal;
   d. a first frequency converter connected to said band pass filter;
   e. a first connected between said first low pass filter and said first frequency converter for deriving a modified color video signal;
   f. a storage tube having horizontal and vertical deflection means;
   g. WRITE circuit means connected to said first adder for applying a field of the modified color video signal to said storage tube when operated;
   h. a horizontal deflection circuit connected to said signal source for supplying a horizontal deflection signal to the horizontal deflection means of said storage tube;
   i. a vertical deflection circuit connected to said signal source for supplying a vertical deflection signal to the vertical deflection means of said storage tube;
   j. READ circuit means connected to said storage tube for reading out a color video signal from the latter when operated;
   k. a second low pass filter connected to said READ circuit means for filtering out a luminance component from said read out color video signal;
   l. a second band pass filter connected to said READ circuit means for filtering out a chrominance component from said read out color video signal;
   m. a second frequency converter connected to said second band pass filter;
   n. a second adder connected to said low pass and band pass filters and further to said horizontal and vertical deflection circuits for deriving a still color television signal; and
   o. a color picture reproducing means connected to said second adder for receiving said still color television signal and for reproducing a still color picture therein;
wherein said horizontal deflection circuit includes a delay circuit and the delay time thereof is selected such that the horizontal scanning period of said storage tube begins at latest at the color burst signal portion of said modified color video signal when said WRITE circuit means is made operative and said color burst portion is stored in the storage tube at the beginning of every horizontal scanning period; said color burst portion is read out from said storage tube when said READ circuit means is made operative; a compensation circuit is connected to said horizontal deflection circuit for making the horizontal scanning size of the READ period substantially equal to that of the WRITE period for said storage tube; and said color picture reproducing means includes a reference oscillator which receivers a color burst component from the still color television signal derived from said second adder and is phase-locked to said color burst component in order to demodulate a plurality of color component signals from said still color television signal.

* * * * *